US012614386B2

(12) United States Patent
He et al.

(10) Patent No.: US 12,614,386 B2
(45) Date of Patent: Apr. 28, 2026

(54) METHOD OF PROCESSING VIDEO, METHOD OF QUERING VIDEO, AND METHOD OF TRAINING MODEL

(71) Applicant: Beijing Baidu Netcom Science Technology Co., Ltd., Beijing (CN)

(72) Inventors: Dongliang He, Beijing (CN); Errui Ding, Beijing (CN); Haifeng Wang, Beijing (CN)

(73) Assignee: Beijing Baidu Netcom Science Technology Co., Ltd., Beijing (CN)

( * ) Notice: Subject to any disclaimer, the term of this patent is extended or adjusted under 35 U.S.C. 154(b) by 708 days.

(21) Appl. No.: 18/145,724

(22) Filed: Dec. 22, 2022

(65) Prior Publication Data

US 2023/0130006 A1      Apr. 27, 2023

(30) Foreign Application Priority Data

Mar. 22, 2022    (CN) .......................... 202210280734.4

(51) Int. Cl.
| | |
|---|---|
| *G06V 20/40* | (2022.01) |
| *G06F 16/73* | (2019.01) |
| *G06F 16/783* | (2019.01) |
| *G06V 10/774* | (2022.01) |
| *G06V 10/86* | (2022.01) |

(52) U.S. Cl.
CPC .............. *G06V 20/46* (2022.01); *G06F 16/73* (2019.01); *G06F 16/783* (2019.01); *G06V 10/774* (2022.01); *G06V 10/86* (2022.01); *G06V 20/48* (2022.01)

(58) Field of Classification Search
CPC ..... G06F 16/73; G06F 16/783; G06N 3/0442; G06N 3/0455; G06N 3/0464; G06N 3/0499; G06N 3/08; G06V 10/454; G06V 10/50; G06V 10/774; G06V 10/82; G06V 10/86; G06V 20/41; G06V 20/46; G06V 20/48
See application file for complete search history.

(56) References Cited

FOREIGN PATENT DOCUMENTS

| | | |
|---|---|---|
| CN | 113239159 | 8/2021 |
| CN | 113808075 | 12/2021 |
| CN | 113888744 | 1/2022 |

(Continued)

OTHER PUBLICATIONS

Liu, Ze, et al. "Video Swin Transformer." arXiv e-prints (2021): arXiv-2106. (Year: 2021).*

(Continued)

*Primary Examiner* — Michael J Vanchy, Jr.
(74) *Attorney, Agent, or Firm* — HSML P.C.

(57) ABSTRACT

The present application provides a method of processing a video, a method of querying a video, and a method of training a video processing model. A specific implementation solution of the method of processing the video includes: extracting, for a video to be processed, a plurality of video features under a plurality of receptive fields; extracting a local feature of the video to be processed according to a video feature under a target receptive field in the plurality of receptive fields; obtaining a global feature of the video to be processed according to a video feature under a largest receptive field in the plurality of receptive fields; and merging the local feature and the global feature to obtain a target feature of the video to be processed.

18 Claims, 9 Drawing Sheets

<u>200</u>

(56) References Cited

FOREIGN PATENT DOCUMENTS

| | | | |
|---|---|---|---|
| CN | 113936339 | 1/2022 | |
| CN | 113936339 A | * 1/2022 | .......... G06F 18/214 |
| CN | 113989593 | 1/2022 | |
| CN | 114066902 | 2/2022 | |

OTHER PUBLICATIONS

Sun, Xiao, et al. "VSRNet: End-to-end video segment retrieval with text query." Pattern Recognition 119 (2021): 108027. (Year: 2021).*

Liu, Ze, et al. "Video swin transformer." Proceedings of the IEEE/CVF conference on computer vision and pattern recognition. 2022. (Year: 2022).*

Extended European Search Report, issued in corresponding European Patent Application No. 22217349.4, dated Aug. 11, 2023, 9 pages.

Liu et al., "Swin Transformer: Hierarchical Vision Transformer using Shifted Windows", 2021 IEEE/CVF International Conference on Computer Vision (ICCV) , IEEE, Oct. 10, 2021, 11 pages.

Khan et al., "Transformers in Vision: A Survey", arxiv. org, Cornell University Library, 201 Olin Library Cornell University Ithaca, NY 14853, Oct. 3, 2021, 30 pages.

Selva et al., "Video Transformers: A Survey", arxiv. org, Cornell University Library, 201 Olin Library Cornell University Ithaca, NY 14853, Jan. 16, 2022, 24 pages.

Japanese Office Action issued in corresponding Japanese Patent Application No. 2022-188641, dated Oct. 3, 2023, 2 pages.

Gu et al., "Video Dialog via Multi-Grained Convolutional Self-Attention Context Multi-Model Networks", IEEE Transactions on Circuits and Systems for Video Technology., vol. 30 No. 12, IEEE, Dec. 1, 2020, p. 4453-4466.

Ze Liu et al., "Video Swin Transformer," arXiv, Jun. 24, 2021, 12 pages.

Xiao Sun et al., "VSRNet: End-to-end video segment retrieval with text query," Pattern Recognition 119 (2021) 108027, May 23, 2021, 10 pages.

Chinese Office Action, issued in the corresponding Chinese patent application No. 202210280734.4, dated Oct. 13, 2022, 23 pages.

* cited by examiner

<u>100</u>

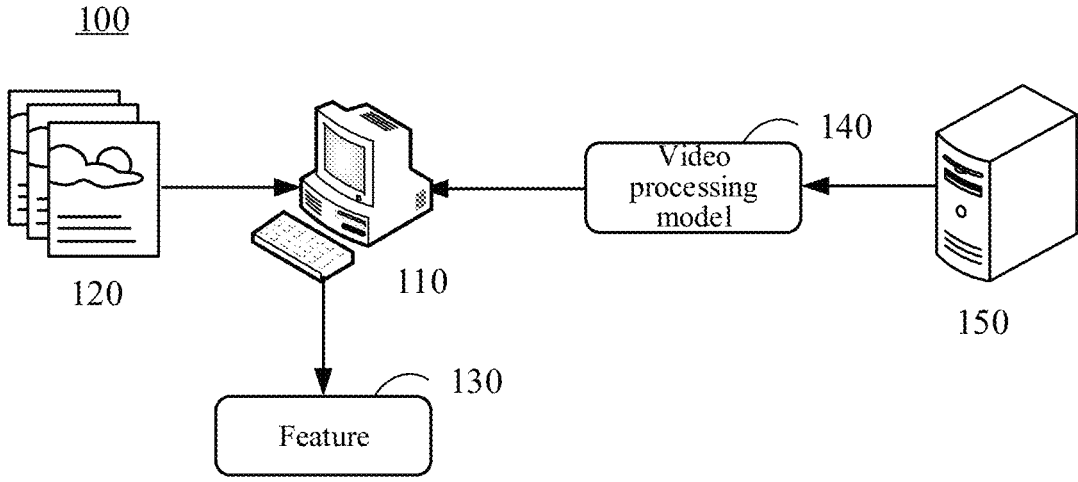

120        110        140        150

130

Feature

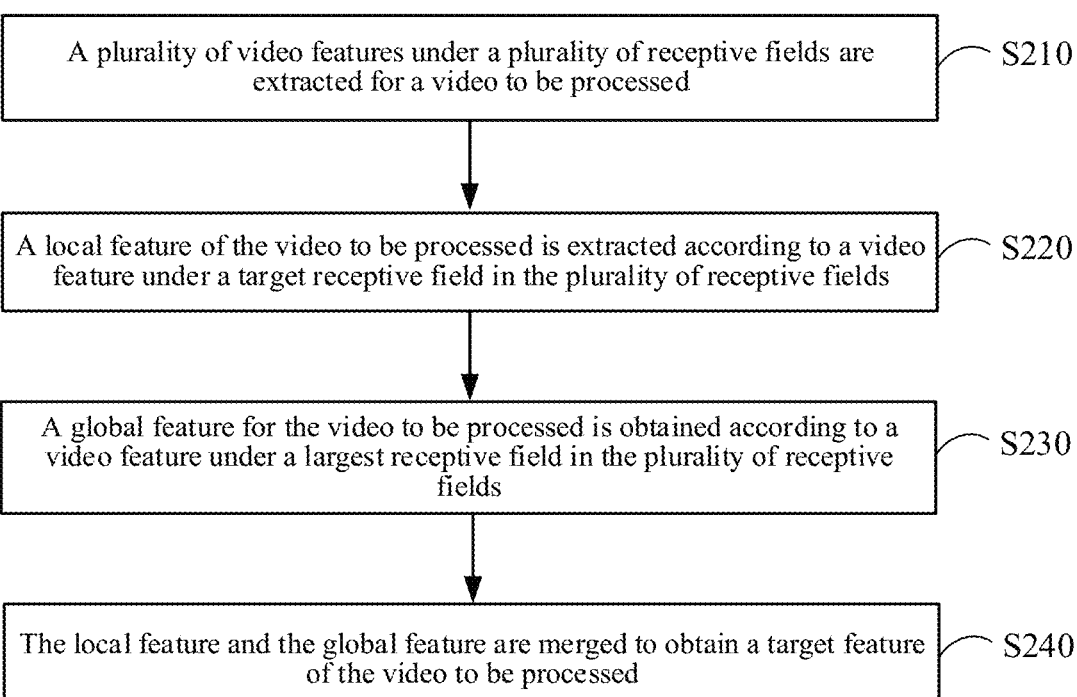

A plurality of video features under a plurality of receptive fields are extracted for a video to be processed — S210

A local feature of the video to be processed is extracted according to a video feature under a target receptive field in the plurality of receptive fields — S220

A global feature for the video to be processed is obtained according to a video feature under a largest receptive field in the plurality of receptive fields — S230

The local feature and the global feature are merged to obtain a target feature of the video to be processed — S240

| A text feature of a query text is extracted | ⌐ S610 |

| A target feature of each video in a plurality of candidate videos is acquired | ⌐ S620 |

| A video matched with the query text is determined from the plurality of candidate videos according to the text feature and the target feature | ⌐ S630 |

<u>700</u>

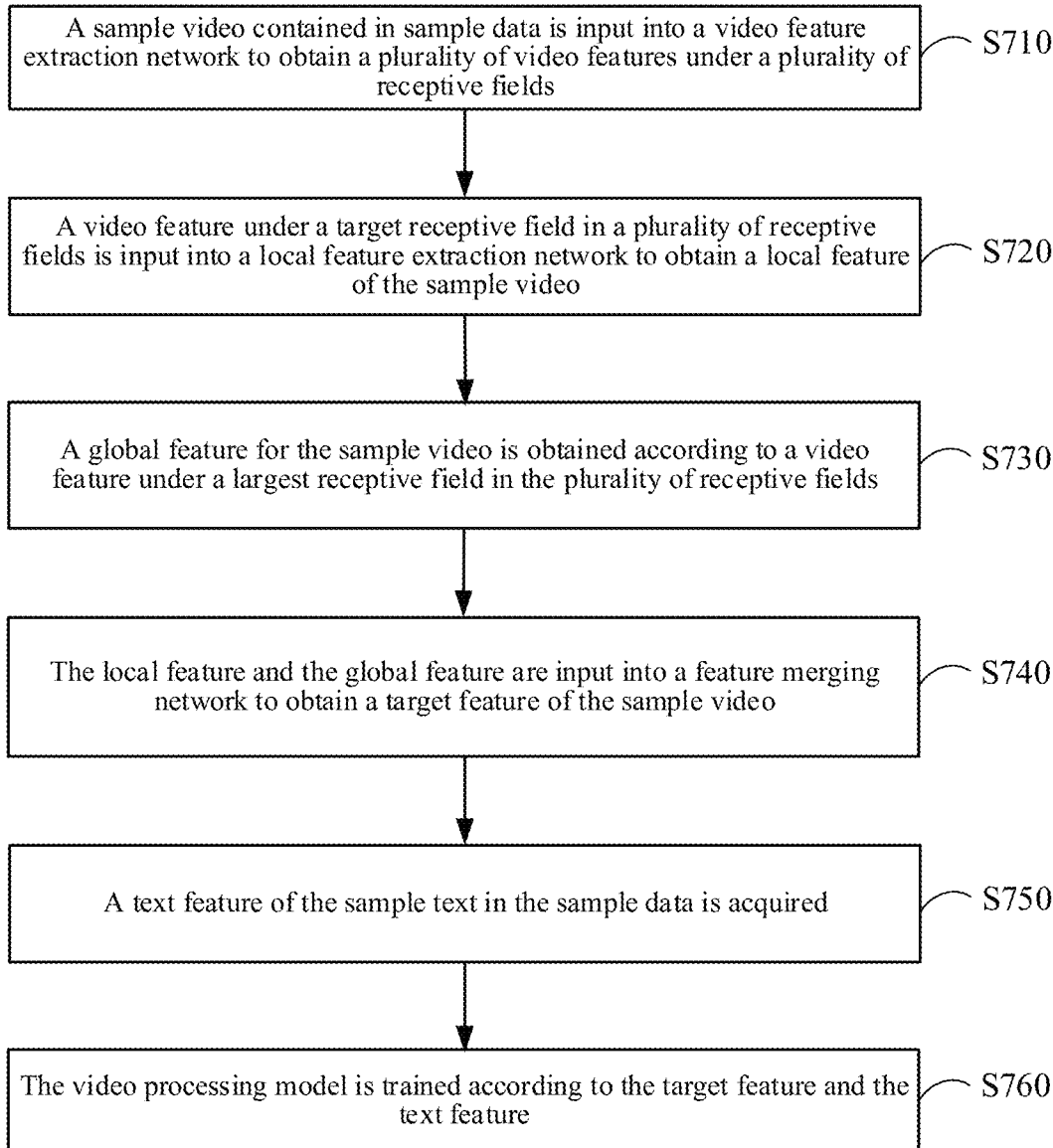

A sample video contained in sample data is input into a video feature extraction network to obtain a plurality of video features under a plurality of receptive fields — S710

A video feature under a target receptive field in a plurality of receptive fields is input into a local feature extraction network to obtain a local feature of the sample video — S720

A global feature for the sample video is obtained according to a video feature under a largest receptive field in the plurality of receptive fields — S730

The local feature and the global feature are input into a feature merging network to obtain a target feature of the sample video — S740

A text feature of the sample text in the sample data is acquired — S750

The video processing model is trained according to the target feature and the text feature — S760

METHOD OF PROCESSING VIDEO, METHOD OF QUERING VIDEO, AND METHOD OF TRAINING MODEL

CROSS-REFERENCE TO RELATED APPLICATION(S)

This application claims the priority of Chinese Patent Application No. 202210280734.4, filed on Mar. 22, 2022, the entire contents of which are hereby incorporated by reference.

TECHNICAL FIELD

The present disclosure relates to a field of artificial intelligence, in particular to fields of computer vision, video understanding and deep learning technologies, and may be applied to smart city, intelligent transportation and other scenarios.

BACKGROUND

With a development of a computer technology and a network technology, a deep learning technology has been widely used in a plurality of fields. For example, the deep learning technology may be adopted to extract a video feature, retrieve a video, classify a video, and so on.

SUMMARY

The present disclosure provides a method of processing a video, a method of querying a video, a method of training a video processing model, an electronic device, and a storage medium, so as to improve an expression ability of a feature.

According to an aspect of the present disclosure, a method of processing a video is provided, including: extracting, for a video to be processed, a plurality of video features under a plurality of receptive fields; extracting a local feature of the video to be processed according to a video feature under a target receptive field in the plurality of receptive fields; obtaining a global feature of the video to be processed according to a video feature under a largest receptive field in the plurality of receptive fields; and merging the local feature and the global feature to obtain a target feature of the video to be processed.

According to another aspect of the present disclosure, a method of querying a video is processed, including: extracting a text feature of a query text; acquiring a target feature of each video in a plurality of candidate videos; and determining, from the plurality of candidate videos, a video matched with the query text according to the text feature and the target feature, wherein the target feature is obtained by using the method of processing the video provided by the present disclosure.

According to another aspect of the present disclosure, a method of training a video processing model is provided, wherein the video processing model includes a video feature extraction network, a local feature extraction network and a feature merging network; the method includes: inputting a sample video contained in sample data into the video feature extraction network, so as to obtain a plurality of video features under a plurality of receptive fields; inputting a video feature under a target receptive field in the plurality of receptive fields into the local feature extraction network, so as to obtain a local feature of the sample video; obtaining a global feature of the sample video according to a video feature under a largest receptive field in the plurality of receptive fields; inputting the local feature and the global feature into the feature merging network, so as to obtain a target feature of the sample video; acquiring a text feature of a sample text in the sample data; and training the video processing model according to the target feature and the text feature.

According to another aspect of the present disclosure, an electronic device is provided, including: at least one processor; and a memory communicatively connected to the at least one processor, wherein the memory stores instructions executable by the at least one processor, and the instructions, when executed by the at least one processor, cause the at least one processor to implement the method described in the present disclosure.

According to another aspect of the present disclosure, a non-transitory computer-readable storage medium having computer instructions therein is provided, and the computer instructions are configured to cause a computer to implement any one of the method of processing the video, the method of querying the video and the method of training the video processing model provided by the present disclosure.

It should be understood that content described in this section is not intended to identify key or important features in embodiments of the present disclosure, nor is it intended to limit the scope of the present disclosure. Other features of the present disclosure will be easily understood through the following description.

BRIEF DESCRIPTION OF THE DRAWINGS

The accompanying drawings are used for better understanding of the solution and do not constitute a limitation to the present disclosure, in which:

FIG. 1 shows a schematic diagram of an application scenario of a method and an apparatus of processing a video, a method and an apparatus of querying a video, and a method and an apparatus of training a video processing model according to embodiments of the present disclosure;

FIG. 2 shows a schematic flowchart of a method of processing a video according to embodiments of the present disclosure;

FIG. 7 shows a schematic flowchart of a method of training a video processing model according to embodiments of the present disclosure;

DETAILED DESCRIPTION OF EMBODIMENTS

Figure 3:
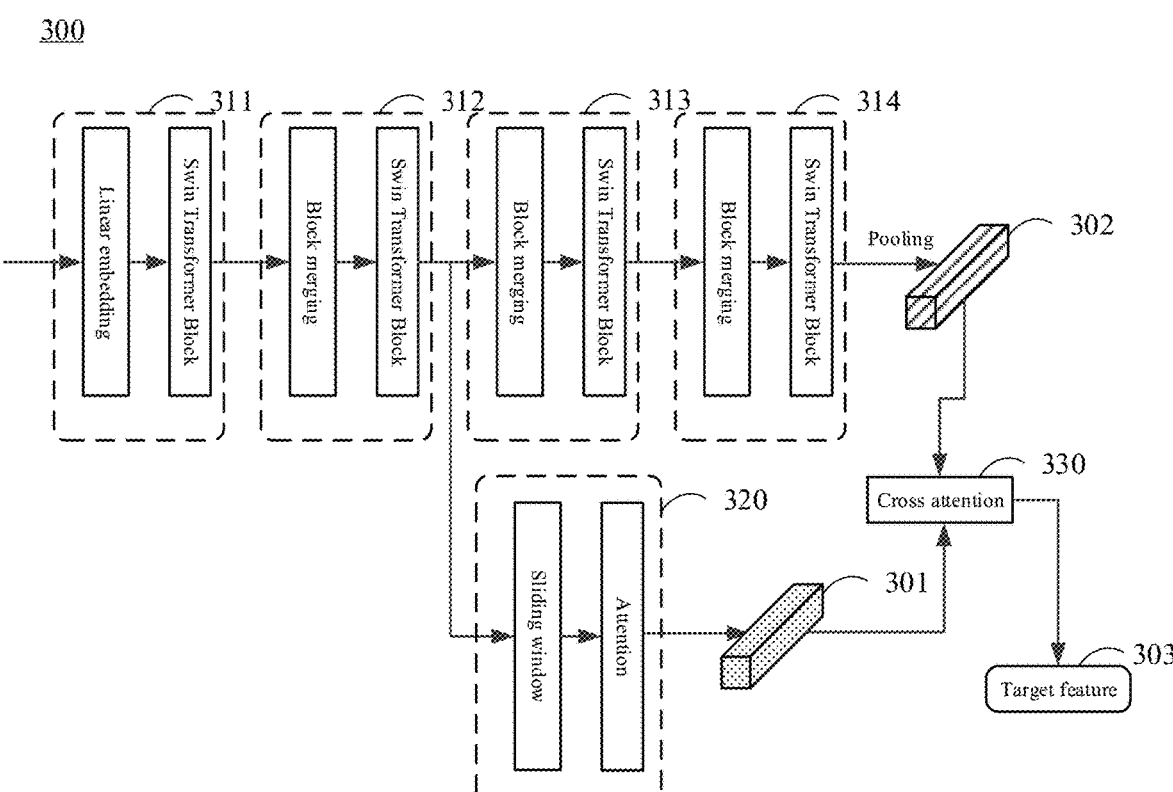
FIG. 3 shows a schematic diagram of a method of processing a video according to embodiments of the present disclosure.

Exemplary embodiments of the present disclosure will be described below with reference to accompanying drawings, which include various details of embodiments of the present disclosure to facilitate understanding and should be considered as merely exemplary. Therefore, those of ordinary skilled in the art should realize that various changes and modifications may be made to embodiments described herein without departing from the scope and spirit of the present disclosure. Likewise, for clarity and conciseness, descriptions of well-known functions and structures are omitted in the following descriptions.

The present disclosure provides a method of processing a video, which includes a video feature extraction stage, a local feature extraction stage, a global feature determination stage, and a feature merging stage. In the video feature extraction stage, a plurality of video features under a plurality of receptive fields are extracted for a video to be processed. In the local feature extraction stage, a local feature of the video to be processed is extracted according to a video feature under a target receptive field in the plurality of receptive fields. In the global feature determination stage, a global feature of the video to be processed is obtained according to a video feature under a largest receptive field in the plurality of receptive fields. In the feature merging stage, the local feature and the global feature are merged to obtain a target feature of the video to be processed.

An application scenario of methods and apparatuses provided by the present disclosure will be described below with reference to FIG. 1.

FIG. 1 shows a schematic diagram of an application scenario of a method and an apparatus of processing a video, a method and an apparatus of querying a video, and a method and an apparatus of training a video processing model according to embodiments of the present disclosure.

As shown in FIG. 1, an application scenario 100 of such embodiments may include an electronic device 110. The electronic device 110 may be various electronic devices with processing functions, including but not limited to smart phones, tablet computers, laptop computers, desktop computers, servers, and so on.

The electronic device 110 may process, for example, an input video 120, so as to extract a feature 130 expressing the video. The extracted feature 130 may be used as a basis for applications such as a video classification, a video query or a video de-duplication in a plurality of scenarios such as an intelligent transportation, an intelligent recommendation, and an intelligent screening, and the scenarios are not limited in the present disclosure.

In an embodiment, the electronic device 110 may process the input video 120 by using a video processing model 140. The video processing model 140 may be a convolutional neural network (CNN) model or an attention-based Transformer model, which is not limited in the present disclosure.

In an embodiment, the video processing model 140 may be trained, for example, by a server 150. The electronic device 110 may be communicatively connected with the server 150 through a network, so as to transmit a model acquisition request to the server 150. Accordingly, the server 150 may transmit a trained video processing model 140 to the electronic device 110 in response to the request.

In an embodiment, the electronic device 110 may further transmit the input video 120 to the server 150, and the server 150 processes the video 120 to obtain a feature expressing the video 120.

It may be understood that in a video query application, whether a video is matched with a query information may be determined according to a similarity between a feature of the query information and a feature of the video. In a video de-duplication application, whether two videos are duplicates of each other may be determined according to a similarity between two features of the two videos.

It should be noted that the method of processing the video and the method of querying the video provided by the present disclosure may be performed by the electronic device 110 or by the server 150. Accordingly, the apparatus of processing the video and the apparatus of querying the video provided by the present disclosure may be arranged in the electronic device 110 or in the server 150. The method of training the video processing model provided by the present disclosure may be performed by the server 150. Accordingly, the apparatus of training the video processing model provided by the present disclosure may be arranged in the server 150.

It should be understood that a number and a type of electronic device 110 and server 150 in FIG. 1 are merely schematic. According to implementation needs, any number and type of electronic devices 110 and servers 150 may be provided.

The method of processing the video provided by the present disclosure will be described in detail below with reference to FIG. 2 to FIG. 5.

FIG. 2 shows a schematic flowchart of a method of processing a video according to embodiments of the present disclosure.

As shown in FIG. 2, a method 200 of processing a video of such embodiments may include operation S210 to operation S230.

In operation S210, a plurality of video features under a plurality of receptive fields are extracted for a video to be processed.

According to embodiments of the present disclosure, the video to be processed may include, for example, a plurality of video frames. A size of each video frame is set to H×W×3 and the number of the plurality of video frames is T, then the video to be processed may be represented as data with a size of T×H×W×3 in such embodiments. H is a height of the video frame, and W is a width of the video frame.

In an embodiment, a step-wise down-sampling may be performed on the data representing the video to be processed by using a plurality of three-dimensional convolutions, so as to obtain a plurality of video features under a plurality of receptive fields.

In an embodiment, the plurality of video features may be extracted by using a Video Swin-Transformer model. Specifically, the data with the size of T×H×W×3 may be divided to obtain data with a size of T/2×H/4×W/4×96. The data with the size of T/2×H/4×W/4×96 may be sequentially processed through multi-stage networks (a plurality of stages) connected in sequence in the Video Swin-Transformer model, and the plurality of stages connected in sequence may output the plurality of video features under the plurality of receptive fields. Each stage outputs a video feature under one receptive field, and the receptive fields of the output video features sequentially increase along a connection sequence of the plurality of stages.

In operation S220, a local feature of the video to be processed is extracted according to a video feature under a target receptive field in the plurality of receptive fields.

According to embodiments of the present disclosure, the target receptive field may be, for example, any receptive field between a largest receptive field and a smallest receptive field in the plurality of receptive fields. Therefore, the video feature under the target receptive field may retain more local information of the video to be processed while improving a processing efficiency. For example, in a case that the plurality of receptive fields include four receptive fields, and the video features under the plurality of receptive fields are sequentially output by four stages connected in sequence, the video feature under the target receptive field may be output by a second stage or a third stage in the four stages connected in sequence, which is not limited in the present disclosure.

According to embodiments of the present disclosure, the video feature under the target receptive field may be divided into a plurality of feature blocks, and then a convolution operation may be performed on each of the plurality of feature blocks to obtain a processed feature block. In such embodiments, a plurality of processed feature blocks obtained by performing the convolution operation on the plurality of feature blocks may be concatenated to obtain the local feature of the video to be processed.

In operation S230, a global feature for the video to be processed is obtained according to a video feature under a largest receptive field in the plurality of receptive fields.

In operation S240, the local feature and the global feature are merged to obtain a target feature of the video to be processed.

According to embodiments of the present disclosure, in a case that the plurality of video features are output by the plurality of stages connected in sequence, the video feature under the largest receptive field is the video feature output by a last stage in the plurality of stages. In such embodiments, the video feature output by the last stage may be used as the global feature for the video to be processed.

According to the embodiments of the present disclosure, the global feature and the local feature may be concatenated, and a concatenated feature may be used as the target feature. Alternatively, in such embodiments, the concatenated feature may be processed by a fully connected layer, and a feature obtained by the processing of the fully connected layer may be used as the target feature.

The method of processing the video according to embodiments of the present disclosure may be implemented to extract the local feature according to the video feature under the target receptive field in the plurality of receptive fields, and merge the local feature with the global feature having the largest receptive field to obtain the target feature expressing the video, so that the target feature may not only express a global information of the video, but also express a local information. Compared with a CNN-based method of extracting a feature and a Transformer-based method of extracting a feature in an end-to-end manner, the present disclosure may improve an expression ability of the extracted video feature, which is conducive to improving an accuracy of a downstream application (such as the video classification, the video query and the video de-duplication described above).

FIG. 3 shows a schematic diagram of a method of processing a video according to embodiments of the present disclosure.

As shown in FIG. 3, in an embodiment 300, a method of processing a video may be implemented by using a Video Swin-Transformer model.

In the embodiment 300, the Video Swin-Transformer model may include four stages, which are used to expand the receptive field of the extracted video feature step by step. Specifically, the data with the size of $T/2 \times H/4 \times W/4 \times 96$ obtained by dividing the data representing the video to be processed may be firstly input into a first stage 311, and a first video feature under a first receptive field may be output by the first stage 311. The first video feature is input into a second stage 312 and processed by the second stage 312, and a second video feature under a second receptive field is output by the second stage 312. By analogy, a third video feature under a third receptive field is output by a third stage 313, and a fourth video feature under a fourth receptive field is output by a fourth stage 314. The receptive field of the first video feature to the receptive field of the fourth video feature increase in sequence. For example, the sizes of the first video feature to the fourth video feature are $T/2 \times H/4 \times W/4 \times C$, $T/2 \times H/8 \times W/8 \times 2C$, $T/2 \times H/16 \times W/16 \times 4C$, $T/2 \times H/32 \times W/32 \times 8C$, respectively, where C is a number of channels of the first stage 311. It may be understood that a structure of the Video Swin-Transformer model including four stages is merely used as an example to facilitate the understanding of the present disclosure, and the present disclosure is not limited thereto.

The first stage 311 may include a linear embedding layer and a Swin Transformer block. The data with the size of $T/2 \times H/4 \times W/4 \times 96$ may be processed by the linear embedding layer, and a feature dimension of the input data may be changed to C, that is, the size of the data output by the linear embedding layer is $T/2 \times H/4 \times W/4 \times C$. The Video Transformer block may be divided into two parts, one is Video W-MSA and the other is Video SW-MSA, where MSA refers to Multi-head Self Attention. The Video W-MSA part firstly performs a layer normalization on the input data. Then, for the data obtained by the layer normalization, starting from an upper left pixel, the data with the size of $T/2 \times H/4 \times W/4 \times C$ is evenly divided into $2 \times 2$ features with a size of $T/2 \times H/8 \times W/8 \times C$ according to a conventional window division strategy, then a multi-head self-attention operation is performed on each feature, and the $2 \times 2$ features after the multi-head self-attention operation may be merged. After a layer normalization and a full connection are performed on the merged feature, a feature to be input into the Video SW-MSA part may be obtained. A processing logic of the Video SW-MSA part is similar to that of the Video W-MSA part with a difference in that a different window division strategy is used for the Video SW-MSA part. A sliding window operation is adopted for the Video SW-MSA part to divide the input data, so that a feature in the shifted window contains a feature in an adjacent window. A connection is introduced between the data in adjacent non-overlapping windows in the Video W-MSA part, so that the receptive field of the data may be increased. The second stage 312 to the fourth stage 314 may all include a patch merging layer and a Swin Transformer block. The patch merging layer is used to merge the input data, and then a dimension reduction may be performed on the merged data by using the linear layer. This dimension reduction may change a spatial size of the data and also change the number of channels.

As shown in FIG. 3, in such embodiments, the fourth video feature may be used as the global feature, and the second video feature output by the second stage 312 may be used as the video feature under the target receptive field. When extracting the local feature according to the second video feature, such embodiments may be implemented to input the video feature under the target receptive field into a local feature extraction branch (Local Branch) 320. The local feature extraction branch 320 may firstly extract the video feature under the target receptive field according to a sliding window with a predetermined size, so as to obtain a plurality of video sub-features. Each of the plurality of video sub-features is then processed by using an attention algorithm, so as to obtain a plurality of processed sub-features. Finally, the local feature of the video to be processed may be obtained according to the plurality of processed sub-features.

According to embodiments of the present disclosure, the local feature extraction branch 320 may include a sliding window layer and an attention layer. The sliding window layer is used to divide the video feature with the size of T/2×H/8×W/8×2C according to the sliding window with the predetermined size. The divided plurality of video sub-features may not overlap with each other. Alternatively, adjacent sub-features in the plurality of divided video sub-features may partially overlap, so that the extracted local feature may fully consider a correlation between adjacent pixel features and improve the expression ability of the local feature. The attention layer is used to perform a self-attention operation on each divided video sub-feature, so as to learn a correlation between a plurality of pixel features in each video sub-feature.

For example, the size of the sliding window used in the sliding window layer may include a size $W\_s$ of a spatial dimension and a size $W\_t$ of a temporal dimension. The spatial dimension refers to a width direction and a height direction, and the temporal dimension refers to a direction of T. Therefore, for the video feature with the size of T/2×H/8×W/8×2C, each extracted video sub-feature has a size of $W\_t×W\_s×W\_s×2C$. It may be understood that the sizes of the sliding window in the width direction and in the height direction in the spatial dimension may be unequal, which is not limited in the present disclosure. When extracting the video sub-features, such embodiments may be implemented to move the sliding window according to a first predetermined stride of the spatial dimension and a second predetermined stride of the temporal dimension. The first predetermined stride is less than a length of the sliding window in the spatial dimension, and the second predetermined stride is less than a length of the sliding window in the temporal dimension. Through the setting of the first predetermined stride and the second predetermined stride, adjacent sub-features in the plurality of extracted video sub-features may have overlapping pixels, so that the extracted local feature may fully consider the correlation between the adjacent pixel features, and the expression ability of the local feature may be improved.

For example, the first predetermined stride may be $W\_s/2$, and the second predetermined stride may be $W\_t/2$. Therefore, an overlapping ratio of the sliding window in the spatial dimension is ½, and an overlapping ratio of the sliding window in the temporal dimension is also ½. The number of the extracted video sub-features may be represented by $N\_h*N\_w*N\_t$ where $N\_h=H/8/W\_s*2$, $N\_w=W/8/W\_s*2$, $N\_t=W/2/W\_t*2$.

After the plurality of processed sub-features are obtained, such embodiments may be implemented to concatenate the plurality of processed sub-features as a local feature 301. Alternatively, the local feature 301 may be obtained by using the method described below, which will not be described in detail here.

After the local feature 301 is obtained, such embodiments may be implemented to process the local feature 301 and a global feature 302 by using a cross attention algorithm, so as to obtain a target feature 303. The global feature 302 may be obtained, for example, by processing the feature with the largest receptive field in the plurality of video features through a pooling. It may be understood that the global feature may also directly be the feature with the largest receptive field output by the Video Swin-Transformer. For example, the local feature 301 and the global feature 302 may be input into a cross attention network 330, and a cross attention operation is performed through the cross attention network. For an implementation principle of the cross attention operation, reference may be made to the following description, which will not be described in detail here. The pooling for the feature with the largest receptive field may be, for example, a global average pooling.

Figure 4:
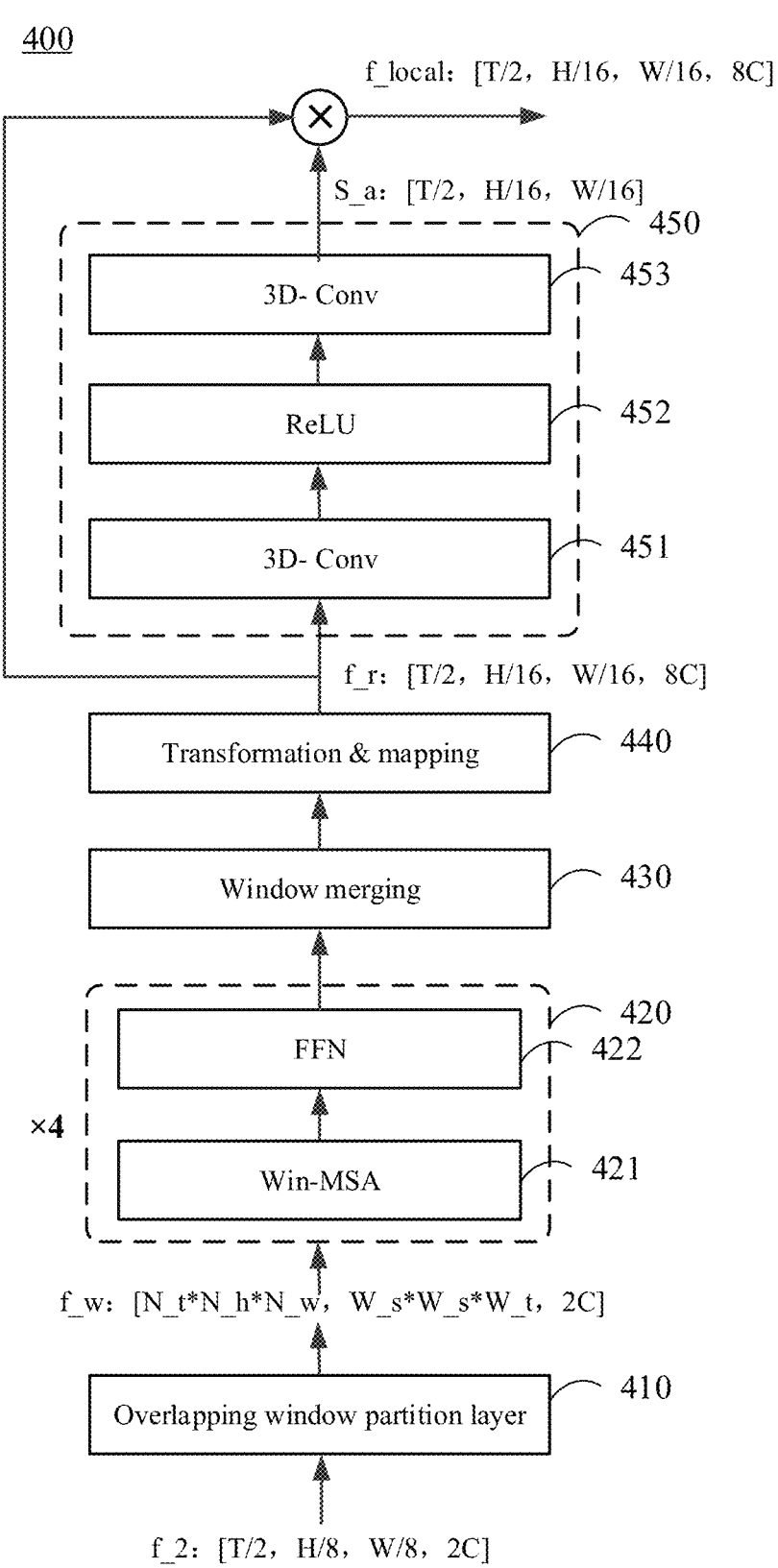
FIG. 4 shows a schematic diagram of extracting a local feature of a video to be processed according to embodiments of the present disclosure.

FIG. 4 shows a schematic diagram of extracting a local feature of a video to be processed according to embodiments of the present disclosure.

According to embodiments of the present disclosure, the local feature of the video to be processed may be extracted by using a local feature extraction network. As shown in FIG. 4, in an embodiment 400, the feature input into the local feature extraction network may be the video feature $f\_2$ with the size of T/2×H/8×W/8×2C described above. After the video feature $f\_2$ is processed by an overlapping window partition layer 410, a plurality of video sub-features may be obtained. The plurality of video sub-features may form a video group $f\_w$, which includes $N\_t*N\_h*N\_w$ video sub-features. Each video sub-feature has a size of $W\_s*W\_s*W\_t$ and a depth of 2C.

As shown in FIG. 4, in the embodiment 400, each video sub-feature may be processed by using a self-attention network 420. The self-attention network 420 may include, for example, four self-attention blocks connected in sequence, and each self-attention block includes a multi-head attention mechanism layer (Win-MSA) 421 and a feed-forward network (FFN) 422. Each video sub-feature may be processed by the self-attention network 420 to obtain a processed sub-feature. Then, a total of $N\_t*N\_h*N\_w$ processed sub-features may be obtained.

After $N\_t*N\_h*N\_w$ processed sub-features are obtained, these processed sub-features may be merged by using a window merging layer 430, so as to obtain a merged feature. Subsequently, such embodiments may be implemented to extract a weight feature of the merged feature by using a three-dimensional convolution, and finally weight the merged feature according to the weight feature to obtain the local feature. By using the local feature extraction network, it is possible to adaptively learn a score of an importance of each pixel feature in the merged feature, so that a feature with a high importance in the merged feature may be highlighted, while a feature with a low importance may be suppressed, and the accuracy of the extracted local feature may be improved. The feature obtained by merging these processed sub-features using the window merging layer 430 may have a size of, for example, T/2×H/8×W/8×2C.

In an embodiment, as shown in FIG. 4, after the plurality of processed sub-features are merged through the window merging layer 430, a dimension transformation and mapping may be performed on the merged feature through a transformation & mapping layer 440. In such embodiments, a feature $f\_r$ obtained by the processing of the transformation & mapping layer 440 may be used as a merged feature.

For example, the transformation & mapping layer 440 may firstly perform a space to depth transformation on the feature output by the window merging layer 430, so as to obtain a feature with a size of T/2×H/16×W/16×8C. Subsequently, the transformation & mapping layer 440 may map the feature with the size of T/2×H/16×W/16×8C by using a three-dimensional convolution (3D-Conv) with a convolution kernel of 1, so as to obtain the merged feature f_r. The merged feature has a size of T/2×H/16×W/16×8C.

In an embodiment, the weight feature may be extracted by using a convolutional network 450 as shown in FIG. 4. The convolutional network 450 may include, for example, a 3D-Conv layer 451, an activation layer ReLU 452 and a 3D-Conv layer 453 connected in sequence. In such embodiments, the merged feature f_r may be input into the convolutional network 450 and processed by the convolutional network 450, so as to output a weight feature S_a. The weight feature S_a has a size of T/2×H/16×W/16. When the weight feature S_a is dot-multiplied by the feature of each depth in the merged feature f_r, a local feature f_local of the video to be processed may be obtained. The local feature f_local may have a size of, for example, T/2×H/16×W/16× 8C.

It may be understood that the structure of the local feature extraction network described in FIG. 4 is merely used as an example to facilitate the understanding of the present disclosure. According to actual needs, any structure of the local feature extraction network may be used, which is not limited in the present disclosure.

Figure 5:
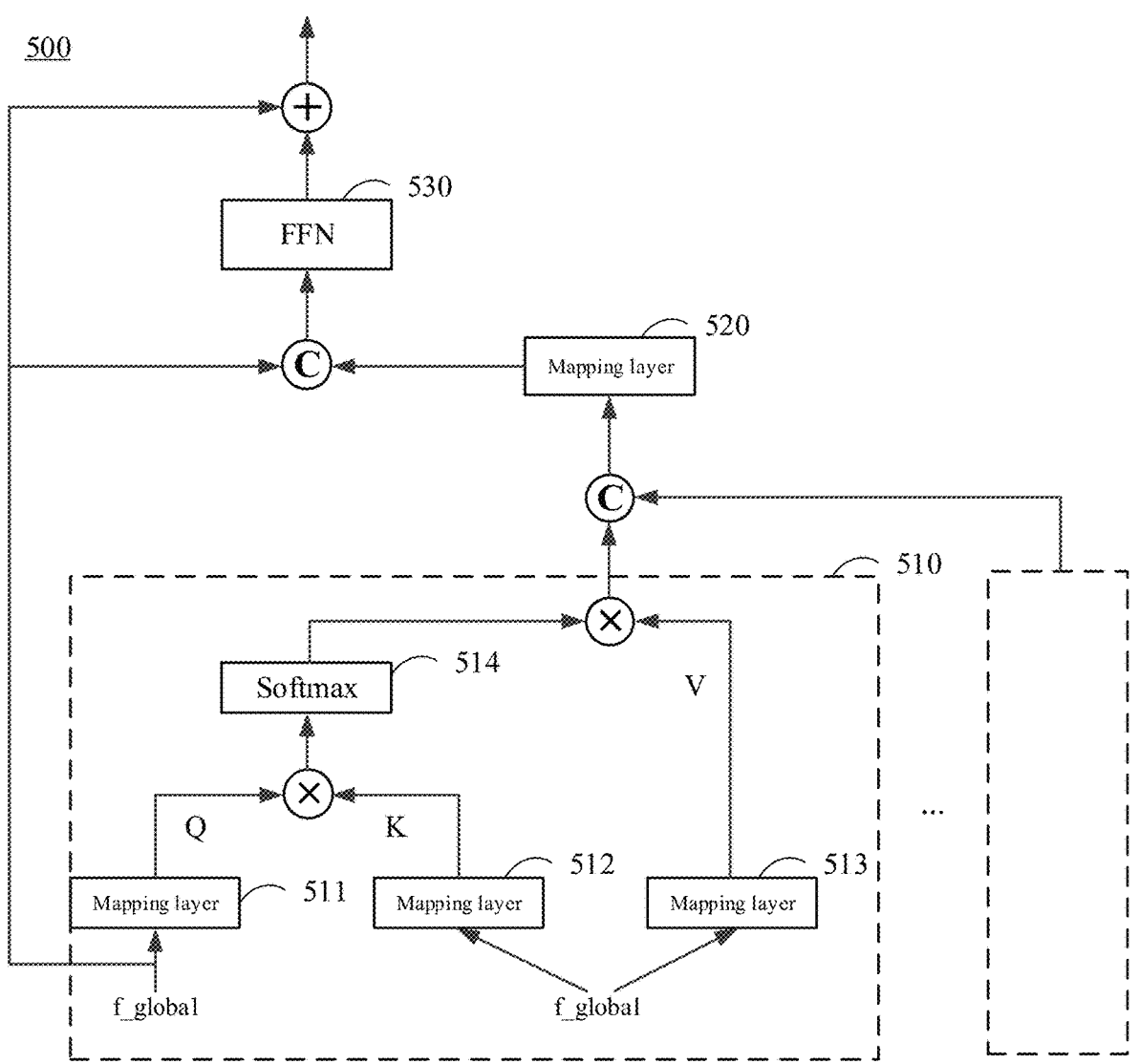
FIG. 5 shows a schematic diagram of merging a global feature and a local feature according to embodiments of the present disclosure.

FIG. 5 shows a schematic diagram of merging a global feature and a local feature according to embodiments of the present disclosure.

According to embodiments of the present disclosure, the local feature f_local and the global feature f_global may be merged by using a cross attention algorithm. In this way, a cross correlation modeling may be performed between the local feature and the global feature, which is conductive to improving the expression ability of the obtained target feature.

For example, in such embodiments, when merging the global feature and the local feature, it is possible to firstly obtain a query feature Q according to the global feature f_global, and obtain a key feature K and a value feature V according to the local feature f_local. Finally, the target feature of the video to be processed may be obtained according to the query feature Q, the key feature K and the value feature V by using the cross attention algorithm.

For example, the query feature Q and the key feature K may be dot-multiplied firstly, a result obtained by the dot multiplication may be normalized, and the normalized feature may be used as a weight to weight the value feature V. The feature obtaining by weighting may be the target feature.

In an embodiment, the cross attention algorithm may be implemented by using a multi-head attention mechanism. Specifically, the local feature f_local and the global feature f_global may be merged by using a feature merging network shown in FIG. 5. For example, as shown in FIG. 5, in an embodiment 500, the feature merging network may be provided with a plurality of attention blocks 510, and each attention block 510 includes mapping layer 511 to mapping layer 513 and a normalization layer (Softmax) 514. The mapping layer 511 is used to map the global feature f_global to obtain the query feature Q, and both the mapping layer 512 and the mapping layer 513 are used to map the local feature to obtain the key feature K and the value feature V respectively. An attention feature may be obtained through each attention block, and the attention feature is the feature obtained by weighting the value feature V. In the embodiment 500, a plurality of attention features obtained by the plurality of attention blocks 510 may be concatenated, and the feature obtained after being processed by the mapping layer 520 may be used as the target feature. In this way, the global feature and the local feature may be learned more fully, and the accuracy of the obtained target feature may be improved.

In an embodiment, the local feature f_local and the global feature f_global may also be merged by using stacked M feature merging networks, so as to further improve the accuracy of the obtained target feature. For example, the video feature with the largest receptive field described above is pooled to obtain a global feature with a size of 1×8C. For the local feature with a size of T/2×H/16×W/16×8C obtained above, such embodiments may be implemented to transform the local feature into a feature sequence. The feature sequence includes T/2*H/16*W/16 features, and each feature has 8C channels. In such embodiments, the global feature may be input into a first network in the stacked M feature merging networks, an output of the first network instead of the global feature may be input into a second network, and so on, then an $M^{th}$ network may output the target feature, where M is an integer greater than 1. Each of the M feature merging networks may include an FFN layer 530 in addition to the plurality of attention blocks 510 and the mapping layer 520 described above. In each network, the feature output by the mapping layer 520 may be concatenated with the global feature input into the network, and then the concatenated feature is processed by the FFN layer 530 and added to the global feature input into the network, so as to obtain the global feature for a next network to the network.

For example, for an $m^{th}$ network in the M feature merging networks, the output global feature may be calculated by the following formula. $f\_global^m = FFN_m(MCA_m(f\_global^{(m-1)}, f\_local)\|f\_global^{(m-1)}) + f\_global^{(m-1)}$ where $f\_global^m$ represents the global feature output by the $m^{th}$ network, $MCA_m$ $(f\_global^{(m-1)}, f\_local)$ represents the feature output by the mapping layer 520 in the $m^{th}$ network by using $f\_global^{(m-1)}$ and f_local as the input of the $m^{th}$ network. $FFN_m$ represents the processing of the FFN layer 530 in the $m^{th}$ network. $\|$ represents a concatenation operation. $MCA_m(f\_global^{(m-1)}, f\_local)$ may be expressed as:

$$MCA_m(f\_global^{(m-1)}, f\_local) = \left(CA_m^{(1)}\|CA_m^{(2)}...\|CA_n^{(n)}\right)W^m$$

where $W^{(m)}$ is a mapping matrix parameter learned by the mapping layer 520. $CA_m^{(i)}$ represents a feature output by an $i^{th}$ attention block in the $m^{th}$ network. n is a total number of attention blocks included in the $m^{th}$ network. $CA_m^{(i)}$ may be calculated, for example, by using the following formula.

$$CA_m^{(i)} = softmax\left(\frac{Q^{i(m)}\left(K^{i(m)}\right)^T}{\sqrt{8C/n}}\right)V^{i(m)}$$

in which:

$$Q^{i(m)} = f\_global^{(m1)}W_Q^{i(m)};$$

-continued $$K^{i(m)} = \text{f\_local} W_K^{i(m)};$$

$$V^{i(m)} = \text{f\_local} W_V^{i(m)}.$$

where $$W_Q^{i(m)}, W_K^{i(m)} \text{ and } W_V^{i(m)}$$

represent the matrix parameters learned by the mapping layer 511, the mapping layer 512 and the mapping layer 513 in the m$^{th}$ network, respectively.

Based on the method of processing the video provided in the present disclosure, the present disclosure further provides a method of querying a video, which will be described in detail below with reference to FIG. 6.

Figure 6:
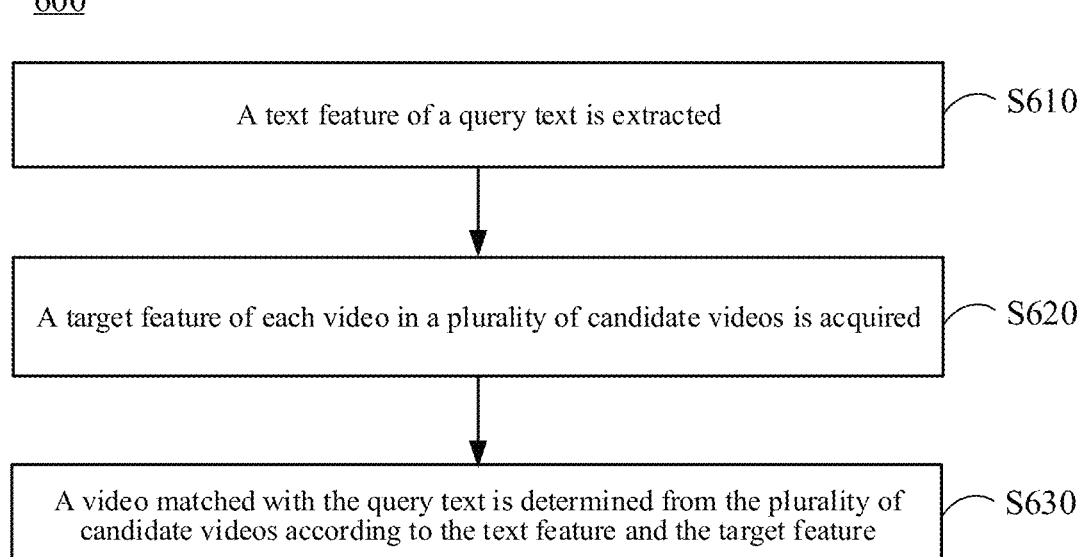
FIG. 6 shows a schematic flowchart of a method of querying a video according to embodiments of the present disclosure.

FIG. 6 shows a schematic flowchart of a method of querying a video according to embodiments of the present disclosure.

As shown in FIG. 6, a method 600 of querying a video of such embodiments may include operation S610 to operation S630.

In operation S610, a text feature of a query text is extracted.

According to embodiments of the present disclosure, the query text may include, for example, a query keyword input by a user through an electronic device. In such embodiments, the text feature may be extracted by using a text feature extraction model capable of extracting a semantic information. The text feature extraction model may include, for example, a recurrent neural network model or a Transformer model. Specifically, a Long-Short Term Memory (LSTM) network or an ERNIE model may be used, which is not limited in the present disclosure.

In operation S620, a target feature of each video in a plurality of candidate videos is acquired.

According to embodiments of the present disclosure, videos in a video library may be used as the candidate videos, and each video may be processed by using the method of processing the video described above, so as to obtain the target feature of each video. In such embodiments, the target feature of each video may be pre-stored, and a mapping relationship between the target feature and each video may be established. In operation S620, the stored target feature may be acquired directly.

In operation S630, a video matched with the query text is determined from the plurality of candidate videos according to the text feature and the target feature.

In such embodiments, the text feature and the target feature may be mapped to a same feature space, and a similarity between two features mapped to the same feature space may be calculated as a similarity between the text feature and the target feature. In such embodiments, a candidate video corresponding to a target feature with a largest similarity to the text feature may be determined as the video matched with the query text. Alternatively, a candidate video corresponding to a target feature of which a similarity to the text feature is greater than a threshold may be determined as the video matched with the query text. The threshold may be set according to actual requirements, and the similarity between features may be represented by Pearson correlation coefficient, cosine similarity, or the like, which is not limited in the present disclosure.

In an embodiment, the text feature extracted in operation S610 may include a word-level feature and a sentence-level feature. In such embodiments, the similarity may be calculated according to the sentence-level feature and the target feature. The word-level feature may include a plurality of word features respectively corresponding to a plurality of words in the query text.

For example, when extracting the text feature, it is possible to tokenize the query text firstly, and obtain, according to a pre-generated dictionary, a plurality of word identifiers respectively corresponding to the plurality of words obtained by tokenization. Each word identifier may be used as a word token, and a token represented by Tx may be set to identify an entire sentence of the query text. Using the Tx as a first token, the plurality of word identifiers may be arranged sequentially after the first token according to a sequence of the words in the query text, so as to obtain a token sequence. In such embodiments, the token sequence may be input into the ERNIE 2.0 model and processed by the ERNIE 2.0 model, so as to output the sentence-level feature corresponding to Tx and the word features corresponding to the plurality of word tokens. The sentence-level feature is obtained by attention weighting and merging the features of the plurality of word tokens through multi-layer multi-head attention mechanism in the ERNIE 2.0 model. It may be understood that it is also possible to perform a single-word segmentation on the query text, and one token may be obtained according to each single-word. Compared with the method of determining the token using a single-word segmentation, the word feature obtained by the method of determining the token using tokenization may retain the semantic information better.

In order to facilitate an execution of the method of processing the video, the present disclosure further provides a method of training a video processing model, which will be described in detail below with reference to FIG. 7.

FIG. 7 shows a schematic flowchart of a method of training a video processing model according to embodiments of the present disclosure.

As shown in FIG. 7, a method 700 of training a video processing model of such embodiments may include operation S710 to operation S750.

In operation S710, a sample video contained in sample data is input into a video feature extraction network to obtain a plurality of video features under a plurality of receptive fields.

According to embodiments of the present disclosure, the sample data may be a batch of data. Each sample data in the batch of data contains a sample video and a sample text. In such embodiments, all the sample data in the batch of data may be sorted into data with a size of B×T×H×W×3 and input into the video feature extraction network, and a plurality of video features corresponding to each sample video may be obtained through the video feature extraction network. An implementation of operation S710 is similar to an implementation of operation S210 described above, and the video feature extraction network may be the Video Swin-Transformer model described above, which is not limited in the present disclosure.

In operation S720, a video feature under a target receptive field in a plurality of receptive fields is input into a local feature extraction network to obtain a local feature of the sample video.

According to embodiments of the present disclosure, an implementation of operation S720 is similar to an implementation of operation S220 described above. For the sample video in a batch of data, the video feature under the target receptive field may be represented by B data with a size of T/2×H/8×W/8×2C. In such embodiments, the B data with a size of T/2×H/8×W/8×2C may be input into the local feature extraction network to obtain B local features with a size of T/2×H/16×W/16×4C.

The local feature extraction network may adopt the structure shown in FIG. 3 or FIG. 4, which is not limited in the present disclosure.

In operation S730, a global feature for the sample video is obtained according to a video feature under a largest receptive field in the plurality of receptive fields. This operation is similar to operation S230 described above, and will not be repeated here.

In operation S740, the local feature and the global feature are input into a feature merging network to obtain a target feature of the sample video.

According to embodiments of the present disclosure, an implementation of operation S740 is similar to an implementation of operation S240 described above, and will not be repeated here. For a sample video in a batch of data, B target features may be obtained.

In operation S750, a text feature of the sample text in the sample data is acquired.

According to embodiments of the present disclosure, an implementation of operation S750 is similar to an implementation of operation S610 described above, and will not be repeated here. Before training the video processing model, such embodiments may be implemented to pre-extract the text feature of the sample text, and the operation S750 may be performed to acquire the stored text feature. For a sample text in a batch of data, B text features may be obtained. The extracted target feature and text feature corresponding to the sample video and sample text contained in each data in a batch of data may form a feature pair.

In operation S760, the video processing model is trained according to the target feature and the text feature.

According to embodiments of the present disclosure, such embodiments may be implemented to train the video processing model in a weak supervision manner. For example, it is set that the sample video and the sample text in each sample data are matched. The sample video and the sample text in each sample data may be, for example, a query text and a played video acquired from a query history, or the sample text in each sample data may be a title of the sample video in each data. In this way, a training cost of the model may be reduced.

For example, for the sample video and the sample text in one sample data, the similarity between the target feature of the sample video and the text feature of the sample text may be close to 1, so an actual similarity between the target feature and the text feature may be set to 1. In such embodiments, the similarity between the target feature and the text feature may be used as a predicted similarity, a loss of the video processing model may be determined according to a difference between the predicted similarity and the actual similarity, and the video processing model is trained by minimizing the loss. Such embodiments may also be implemented to train the video processing model according to a distance between the target feature and the text feature. An objective of training the model according to the distance is that for one sample data, the distance between the target feature of the sample video and the text feature of the sample text is close to 0.

In an embodiment, during the process of training the video processing model, it is also possible to learn a negative sample to improve a convergence efficiency of the model. For example, for a sample video and a sample text respectively from two different sample data, the similarity between the target feature of the sample video and the text feature of the sample text may be close to 0. Therefore, the sample video and the sample text respectively from two different data may form a negative sample, and the actual similarity between the target feature of the sample video and the text feature of the sample text in the negative sample is set to 0. Accordingly, the sample video and the text video in one sample data may form a positive sample.

For example, in such embodiments, the loss of the video processing model may be determined by using a cross-entropy loss function, so that features of video and text in a positive sample are brought closer, and features of video and text in a negative sample are pushed away.

In an embodiment, it is set that in one sample data, the sample video is $v_j$, the sample text is $t_j$, the target feature of the sample video $v_j$ is $f_j$, and the text feature of the sample text $t_j$ is $g_j$. In such embodiments, the loss of the video processing model may also be determined by using the following contrastive loss function.

$$L_{global} = -\sum_j \log\left(\frac{\exp(f_j \cdot g_j/\tau)}{\exp(f_j \cdot g_j/\tau) + \sum_{k \neq j} \exp(f_j \cdot g_k/\tau)}\right) -$$

$$\sum_j \log\left(\frac{\exp(g_j \cdot f_j/\tau)}{\exp(g_j \cdot f_j/\tau) + \sum_{k \neq j} \exp(g_j \cdot f_k/\tau)}\right)$$

where $\tau$ is a hyper-parameter, and $f_j \cdot g_j$ represents an inner product of $f_j$ and $g_j$.

In an embodiment, the text feature acquired in operation S750 may include a sentence-level feature of the sample text. The similarity between the target feature and the text feature described above in such embodiments may be a similarity between the target feature and the sentence-level feature of the sample text. In this way, the target feature of the video that combines the local feature and the global feature may be aligned with the sentence-level feature of the text, and it is convenient to query a matched video according to the query text, because the sentence-level feature of the text may better express semantics of the text.

Figure 8:
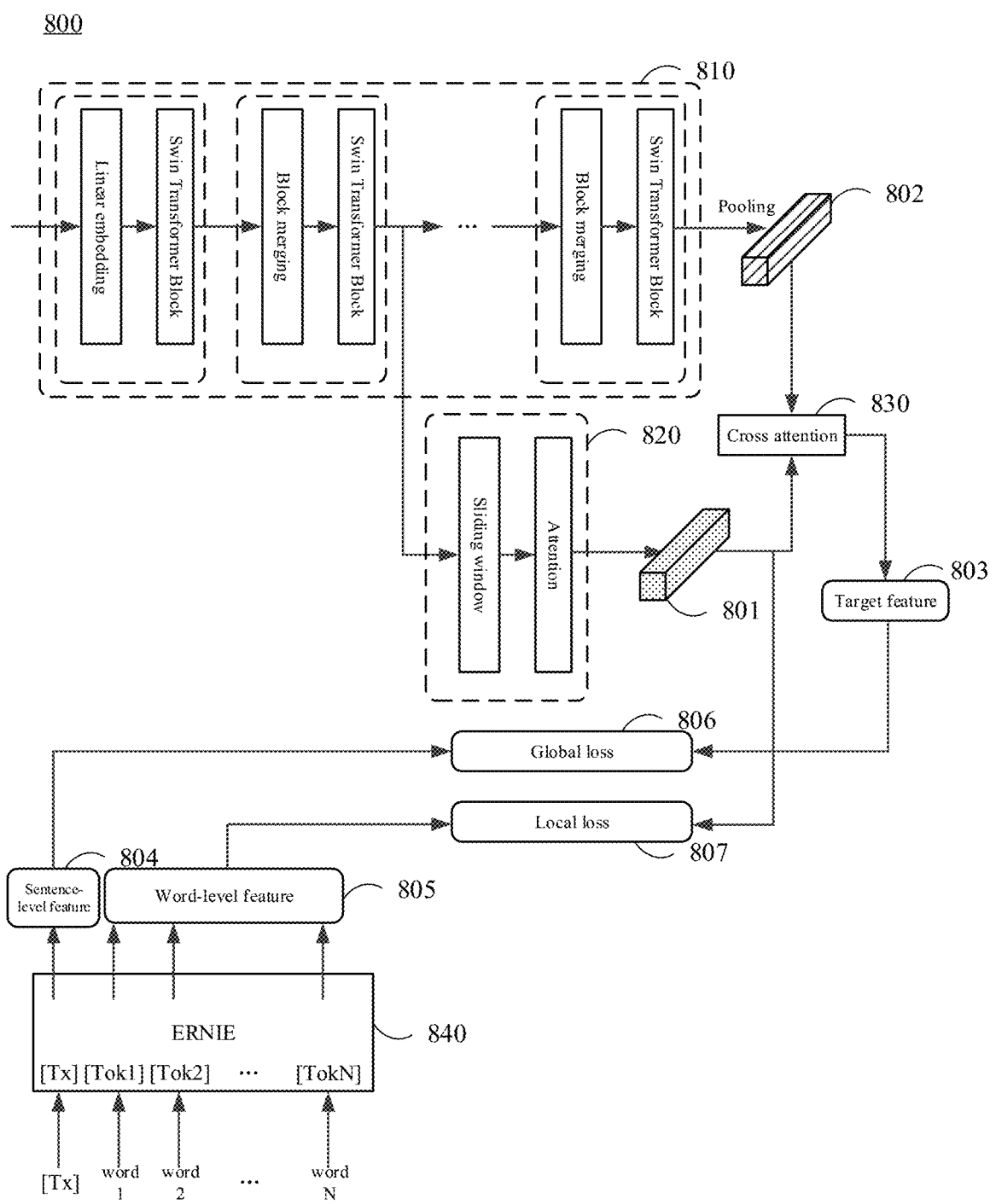
FIG. 8 shows a schematic diagram of a method of training a video processing model according to embodiments of the present disclosure.

FIG. 8 shows a schematic diagram of a method of training a video processing model according to embodiments of the present disclosure.

According to embodiments of the present disclosure, the text feature obtained above may include, for example, a word-level feature of the sample text in addition to the sentence-level feature. The word-level feature may include a plurality of word features respectively corresponding to a plurality of words obtained by tokenizing the sample text. In such embodiments, in addition to training the video processing model according to the sentence-level feature and the target feature, the video processing model may also be trained according to the local feature of the sample video and the word-level feature of the sample text. In this way, the local feature of the video may be better aligned with the local feature of the text, and it is convenient to improve a robustness of the trained video processing model. This is because some entity information may be contained in a text content such as a title text of the video, and the entity information is relatively easy to correspond to a partial image of a video frame. In addition, in such embodiments, the accuracy of the trained model may be improved because the video processing model is trained using the word-level feature that may better express the semantic information than the single-word-level feature.

As shown in FIG. 8, in an embodiment 800, when training the video processing model, the sample video may be processed through a video feature extraction network 810, and the feature output by the second stage may be determined as the video feature under the target receptive field. The video feature under the target receptive field may be processed by a local feature extraction network 820 (which may be the local feature extraction branch described above) to obtain a local feature 801. By performing a global average pooling operation on the video feature output by the last stage in the plurality of stages connected in sequence, a global feature 802 of the sample video may be obtained. The global feature 802 and the local feature 801 are merged by a feature merging network 830 to obtain a target feature 803, and the feature merging network 830 may merge features by using a cross attention algorithm. At the same time, after the sample text is tokenized, the identifier of each word is used as a token, so that Token 1 to Token N may be obtained. The N tokens and the top-ranked Tx are input into an ERNIE 2.0 model 840 to obtain a sentence-level feature 804 and a word-level feature 805 of the sample text. The sentence-level feature 804 corresponds to Tx. The word-level feature 805 includes N word features respectively corresponding to Token 1 to Token N.

Subsequently, such embodiments may be implemented to obtain a global loss 806 of the video processing model according to a similarity between the target feature 803 and the sentence-level feature 804, obtain a local loss 807 of the video processing model according to the local feature 801 and the word-level feature 805, and finally training the video processing model by using a weighted sum of the global loss 806 and the local loss 807 as an overall loss. Alternatively, it is possible to train the entire video processing model according to the global loss 80, and train the local feature extraction network 820 according to the local loss 807.

In an embodiment, for one sample data, a first similarity between each word feature in the word-level feature and the local feature of the sample video may be determined, and a plurality of first similarities may be obtained for a plurality of word features. In such embodiments, the local loss 807 of the video processing model may be determined according to the plurality of first similarities, and the video processing model may be trained. For example, in such embodiments, an average value of the plurality of first similarities or a largest similarity in the plurality of first similarities may be used as the predicted similarity between the word-level feature and the local feature. The local loss for the sample data may be determined by using the cross-entropy loss function described above. In such embodiments, a sum of local losses for all data in a batch of data may be determined as the local loss 807 of the video processing model.

In an embodiment, during the process of training the video processing model, it is also possible to learn the negative sample to improve the convergence efficiency of the model. Therefore, such embodiments may be implemented to further calculate a similarity between each word feature of the sample text in the negative sample and the local feature of the sample video in the negative sample, and determine a local loss for the negative sample according to the similarity.

In an embodiment, for any sample text, sample data of another sample text containing no word obtained by tokenizing the sample text in a batch of sample data may be determined as target sample data for the sample text, and the sample text and a sample video in the target sample data may form a negative sample. This is because a local feature of the sample video in the sample data may include a feature matched with a word feature of the sample text when the other sample text of the sample data contains a same word as the sample text. By constructing the negative sample in this way, a reference value of the negative sample may be improved, and the convergence speed of the video processing model may be improved.

Specifically, in such embodiments, for each word feature in the plurality of word features, a second similarity between each word feature and the local feature of the sample video in the target sample data may be determined, so that a plurality of second similarities respectively corresponding to the plurality of word features may be obtained. Then, the local loss of the video processing model may be determined according to the plurality of first similarities obtained above and the plurality of second similarities. Finally, the video processing model may be trained according to the local loss.

In an embodiment, after the plurality of word features are obtained, a feature corresponding to an entity word may be selected from the plurality of word features, because a word other than the entity word generally may not correspond to a partial image of the video.

In an embodiment, for the text $t_j$, the extracted word feature may be represented, for example, by a sequence $$g^{(j)} = \left\{ g_1^{(j)}, g_2^{(j)}, \dots, g_{N_j}^{(j)} \right\},$$

where $N_j$ is a number of entity words contained in the text $t_j$. In such embodiments, the local feature of the sample video may be converted to be represented by a feature sequence $$f\_local^{(j)} = \left\{ f_1^{(j)}, f_2^{(j)}, \dots, f_{H/16*W/16*T/2}^{(j)} \right\}.$$

In such embodiments, the local loss may be calculated, for example, using the following formula.

$$L_{local} = -\sum_j \sum_{n=1}^{N_j} \log f\left( g_n^{(j)}, f_{local}^{(j)}, f_{local}^{(k)} \right)$$

in which:

$$\log f\left( g_n^{(j)}, f_{local}^{(j)}, f_{local}^{(k)} \right) =$$

$$\frac{\exp\left( s\left( g_n^{(j)}, f_{local}^{(j)} \right)/\tau \right)}{\exp\left( s\left( g_n^{(j)}, f_{local}^{(j)} \right)/\tau \right) + \sum_{k \in Neg(n,j)} \exp\left( s\left( g_n^{(j)}, f_{local}^{(k)} \right)/\tau \right)};$$

$$s\left( g_n^{(j)}, f_{local}^{(j)} \right) = \max\left( g_n^{(j)} \cdot f_1^{(j)}, g_n^{(j)} \cdot f_2^{(j)}, \dots, g_n^{(j)} \cdot f_{H/16*W/16*T/2}^{(j)} \right).$$

where $Neg(n, j)$ represents a negative sample formed by the aforementioned any sample text and the sample video in the target sample data for the sample text.

According to the method of processing the video provided in the present disclosure, the present disclosure further provides an apparatus of processing a video, which will be described in detail below with reference to FIG. 9.

Figure 9:
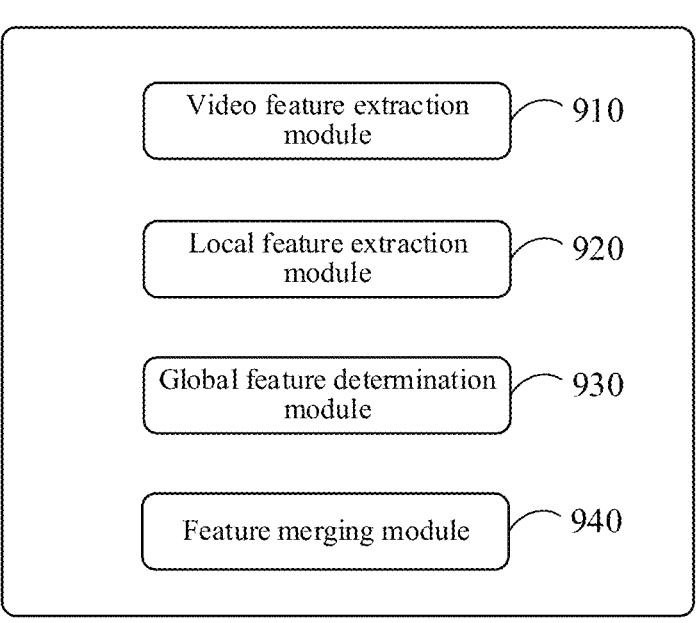
FIG. 9 shows a structural block diagram of an apparatus of processing a video according to embodiments of the present disclosure.

FIG. 9 shows a structural block diagram of an apparatus of processing a video according to embodiments of the present disclosure.

As shown in FIG. 9, an apparatus 900 of processing a video in such embodiments may include a video feature extraction module 910, a local feature extraction module 920, a global feature determination module 930, and a feature merging module 940.

The video feature extraction module 910 may be used to extract, for a video to be processed, a plurality of video features under a plurality of receptive fields. In an embodiment, the video feature extraction module 910 may be used to perform operation S210 described above, which will not be repeated here.

The local feature extraction module 920 may be used to extract a local feature of the video to be processed according to a video feature under a target receptive field in the plurality of receptive fields. In an embodiment, the local feature extraction module 920 may be used to perform operation S220 described above, which will not be repeated here.

The global feature determination module 930 may be used to obtain a global feature of the video to be processed according to a video feature under a largest receptive field in the plurality of receptive fields. In an embodiment, the global feature determination module 930 may be used to perform operation S230 described above, which will not be repeated here.

The feature merging module 940 may be used to merge the local feature and the global feature to obtain a target feature of the video to be processed. In an embodiment, the feature merging module 940 may be used to perform operation S240 described above, which will not be repeated here.

According to embodiments of the present disclosure, the local feature extraction module 920 may include a feature extraction sub-module, a feature processing sub-module, and a local feature obtaining sub-module. The feature extraction sub-module may be used to extract a video feature under the target receptive field according to a sliding window with a predetermined size, so as to obtain a plurality of video sub-features. The feature processing sub-module may be used to process, for each sub-feature in the plurality of video sub-features, the sub-feature by using an attention algorithm, so as to obtain a processed sub-feature. The local feature obtaining sub-module may be used to obtain the local feature according to a plurality of processed sub-features obtained for the plurality of video sub-features.

According to embodiments of the present disclosure, the local feature obtaining sub-module may include a merging unit, a weight extraction unit, and a weighting unit. The merging unit may be used to merge the plurality of processed sub-features to obtain a merged feature. The weight extraction unit may be used to extract a weight feature of the merged feature by using a three-dimensional convolution. The weighting unit may be used to weight the merged feature according to the weight feature, so as to obtain the local feature.

According to embodiments of the present disclosure, the feature extraction sub-module may be used to: move the sliding window according to a first predetermined stride of a spatial dimension and a second predetermined stride of a temporal dimension, so as to extract the plurality of video sub-features. The first predetermined stride is less than a length of the sliding window in the spatial dimension, and the second predetermined stride is less than a length of the sliding window in the temporal dimension.

According to embodiments of the present disclosure, the feature merging module 940 may be used to merge the local feature and the global feature by using a cross attention algorithm, so as to obtain the target feature.

According to embodiments of the present disclosure, the feature merging module 940 may include a first obtaining sub-module, a second obtaining sub-module, and an attention sub-module. The first obtaining sub-module may be used to obtain a query feature according to the global feature. The second obtaining sub-module may be used to obtain a key feature and a value feature according to the local feature. The attention sub-module may be used to obtain the target feature according to the query feature, the key feature and the value feature by using the cross attention algorithm.

According to the method of querying the video provided in the present disclosure, the present disclosure further provides an apparatus of querying a video, which will be described in detail below with reference to FIG. 10.

Figure 10:
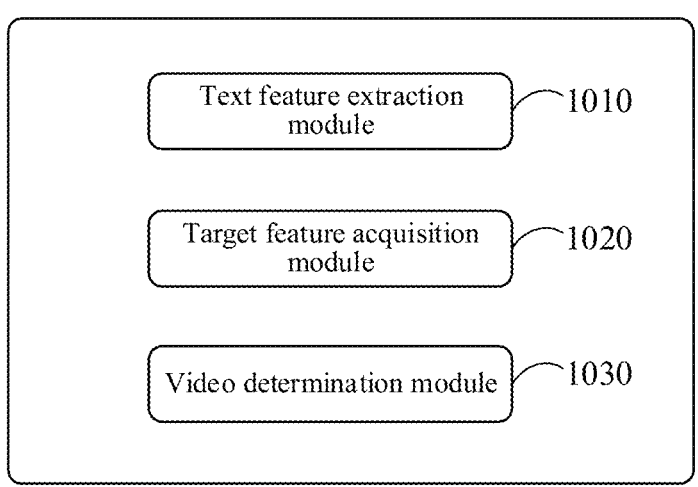
FIG. 10 shows a structural block diagram of an apparatus of querying a video according to embodiments of the present disclosure.

FIG. 10 shows a structural block diagram of an apparatus of querying a video according to embodiments of the present disclosure.

As shown in FIG. 10, an apparatus 1000 of querying a video in such embodiments may include a text feature extraction module 1010, a target feature acquisition module 1020, and a video determination module 1030.

The text feature extraction module 1010 may be used to extract a text feature of a query text. In an embodiment, the text feature extraction module 1010 may be used to perform operation S610 described above, which will not be repeated here.

The target feature acquisition module 1020 may be used to acquire a target feature of each video in a plurality of candidate videos. The target feature is obtained by using the apparatus of processing the video provided in the present disclosure. In an embodiment, the target feature acquisition module 1020 may be used to perform operation S620 described above, which will not be repeated here.

The video determination module 1030 may be used to determine, from the plurality of candidate videos, a video matched with the query text according to the text feature and the target feature. In an embodiment, the video determination module 1030 may be used to perform operation S630 described above, which will not be repeated here.

According to the method of training the video processing model provided in the present disclosure, the present disclosure further provides an apparatus of training a video processing model, which will be described in detail below with reference to FIG. 11.

Figure 11:
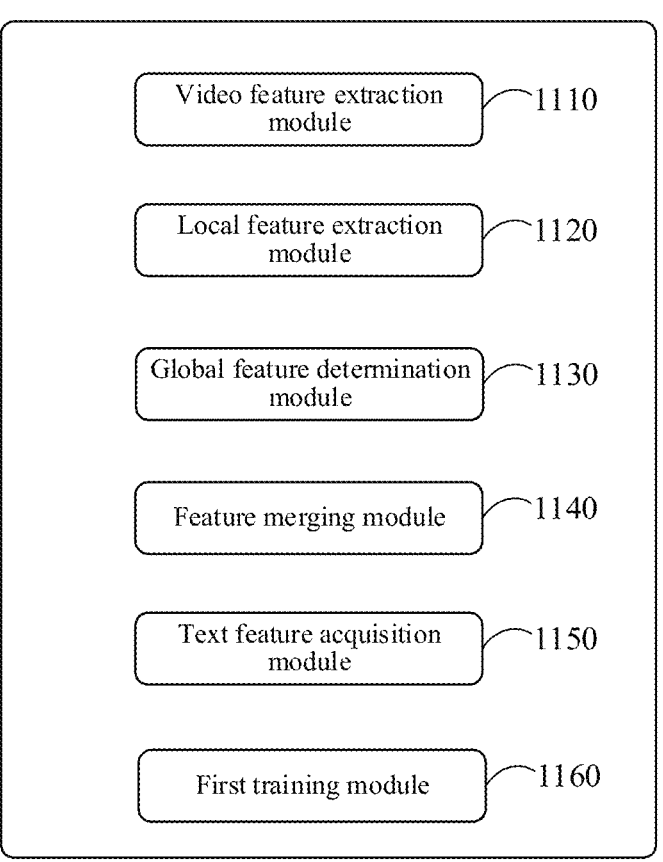
FIG. 11 shows a structural block diagram of an apparatus of training a video processing model according to embodiments of the present disclosure.

FIG. 11 shows a structural block diagram of an apparatus of training a video processing model according to embodiments of the present disclosure.

As shown in FIG. 11, an apparatus 1100 of training a video processing model of such embodiments may include a video feature extraction module 1110, a local feature extraction module 1120, a global feature determination module 1130, a feature merging module 1140, a text feature acquisition module 1150, and a first training module 1160. The video processing model includes a video feature extraction network, a local feature extraction network and a feature merging network.

The video feature extraction module 1110 may be used to input a sample video contained in sample data into the video feature extraction network, so as to obtain a plurality of video features under a plurality of receptive fields. In an embodiment, the video feature extraction module 1110 may be used to perform operation S710 described above, which will not be repeated here.

The local feature extraction module 1120 may be used to input a video feature under a target receptive field in the plurality of receptive fields into the local feature extraction network, so as to obtain a local feature of the sample video. In an embodiment, the local feature extraction module 1120 may be used to perform operation S720 described above, which will not be repeated here.

The global feature determination module 1130 may be used to obtain a global feature of the sample video according to a video feature under a largest receptive field in the plurality of receptive fields. In an embodiment, the global feature determination module 1130 may be used to perform operation S730 described above, which will not be repeated here.

The feature merging module 1140 may be used to input the local feature and the global feature into the feature merging network, so as to obtain a target feature of the sample video. In an embodiment, the feature merging module 1140 may be used to perform operation S740 described above, which will not be repeated here.

The text feature acquisition module 1150 may be used to acquire a text feature of a sample text in the sample data. In an embodiment, the text feature acquisition module 1150 may be used to perform operation S750 described above, which will not be repeated here.

The first training module 1160 may be used to train the video processing model according to the target feature and the text feature. In an embodiment, the first training module 1160 may be used to perform operation S760 described above, which will not be repeated here.

According to embodiments of the present disclosure, the text feature includes a sentence-level feature of the sample text. The first training module 1160 may be used to train the video processing model according to a similarity between the target feature and the sentence-level feature.

According to embodiments of the present disclosure, the text feature further includes a word-level feature of the sample text. The apparatus 1100 of training the video processing model may further include a second training module used to train the video processing model according to the local feature and the word-level feature.

According to embodiments of the present disclosure, the word-level feature includes a plurality of word features respectively corresponding to a plurality of entity words contained in the sample text. The second training module may include a first determination sub-module and a training sub-module. The first determination sub-module may be used to determine a similarity between each word feature in the plurality of word features and the local feature, so as to obtain a plurality of first similarities. The training sub-module may be used to train the video processing model according to the plurality of first similarities.

According to embodiments of the present disclosure, the second training module may further include a second determination sub-module used to determine, for each word feature, a similarity between the word feature and the local feature of the sample video in target sample data, so as to obtain a plurality of second similarities respectively corresponding to the plurality of word features. The training sub-module may include a loss determination unit and a training unit. The loss determination unit may be used to determine a loss of the video processing model according to the plurality of first similarities and the plurality of second similarities. The training unit may be used to train the video processing model according to the loss. The sample text in the target sample data does not contain a word corresponding to the plurality of word features.

It should be noted that in the technical solution of the present disclosure, a collection, a storage, a use, a processing, a transmission, a provision, a disclosure and an application of user personal information involved comply with provisions of relevant laws and regulations, take necessary confidentiality measures, and do not violate public order and good custom. In the technical solution of the present disclosure, the acquisition or collection of user personal information has been authorized or allowed by users.

According to embodiments of the present disclosure, the present disclosure further provides an electronic device, a readable storage medium, and a computer program product.

Figure 12:
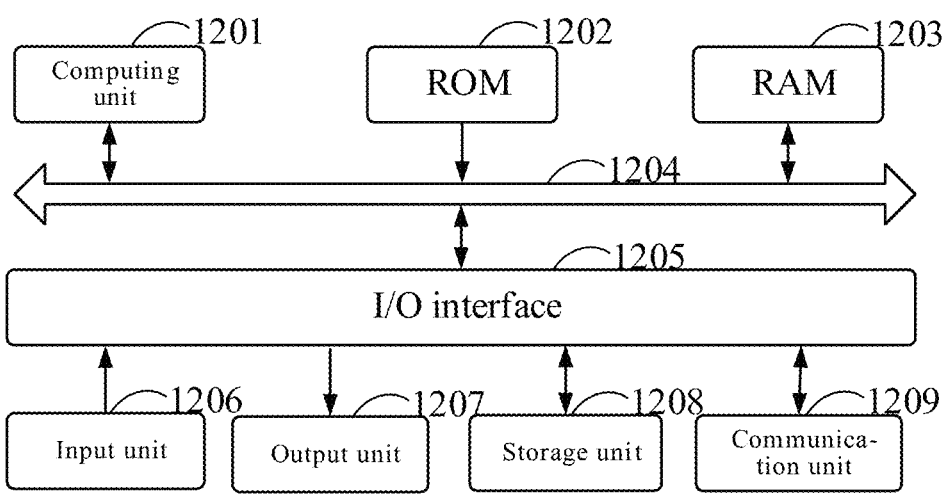
FIG. 12 shows a block diagram of an electronic device for implementing any method of embodiments of the present disclosure.

FIG. 12 shows a schematic block diagram of an example electronic device 1200 for implementing any method in embodiments of the present disclosure. The electronic device is intended to represent various forms of digital computers, such as a laptop computer, a desktop computer, a workstation, a personal digital assistant, a server, a blade server, a mainframe computer, and other suitable computers. The electronic device may further represent various forms of mobile devices, such as a personal digital assistant, a cellular phone, a smart phone, a wearable device, and other similar computing devices. The components as illustrated herein, and connections, relationships, and functions thereof are merely examples, and are not intended to limit the implementation of the present disclosure described and/or required herein.

As shown in FIG. 12, the electronic device 1200 includes a computing unit 1201 which may perform various appropriate actions and processes according to a computer program stored in a read only memory (ROM) 1202 or a computer program loaded from a storage unit 1208 into a random access memory (RAM) 1203. In the RAM 1203, various programs and data necessary for an operation of the electronic device 1200 may also be stored. The computing unit 1201, the ROM 1202 and the RAM 1203 are connected to each other through a bus 1204. An input/output (I/O) interface 1205 is also connected to the bus 1204.

A plurality of components in the electronic device 1200 are connected to the I/O interface 1205, including: an input unit 1206, such as a keyboard, or a mouse; an output unit 1207, such as displays or speakers of various types; a storage unit 1208, such as a disk, or an optical disc; and a communication unit 1209, such as a network card, a modem, or a wireless communication transceiver. The communication unit 1209 allows the electronic device 1200 to exchange information/data with other devices through a computer network such as Internet and/or various telecommunication networks.

The computing unit 1201 may be various general-purpose and/or dedicated processing assemblies having processing and computing capabilities. Some examples of the computing units 1201 include, but are not limited to, a central processing unit (CPU), a graphics processing unit (GPU), various dedicated artificial intelligence (AI) computing chips, various computing units that run machine learning model algorithms, a digital signal processing processor (DSP), and any suitable processor, controller, microcontroller, etc. The computing unit 1201 executes various methods and steps described above, such as any one of the method of processing the video, the method of querying the video and the method of training the video processing model. For example, in some embodiments, any one of the method of processing the video, the method of querying the video and the method of training the video processing model may be implemented as a computer software program which is tangibly embodied in a machine-readable medium, such as the storage unit 1208. In some embodiments, the computer program may be partially or entirely loaded and/or installed in the electronic device 1200 via the ROM 1202 and/or the communication unit 1209. The computer program, when loaded in the RAM 1203 and executed by the computing unit 1201, may execute one or more steps in any one of the method of processing the video, the method of querying the video and the method of training the video processing model described above. Alternatively, in other embodiments, the computing unit 1201 may be used to perform any one of the method of processing the video, the method of querying the video and the method of training the video processing model by any other suitable means (e.g., by means of firmware).

Various embodiments of the systems and technologies described herein may be implemented in a digital electronic circuit system, an integrated circuit system, a field programmable gate array (FPGA), an application specific integrated circuit (ASIC), an application specific standard product (ASSP), a system on chip (SOC), a complex programmable logic device (CPLD), a computer hardware, firmware, software, and/or combinations thereof. These various embodiments may be implemented by one or more computer programs executable and/or interpretable on a programmable system including at least one programmable processor. The programmable processor may be a dedicated or general-purpose programmable processor, which may receive data and instructions from a storage system, at least one input device and at least one output device, and may transmit the data and instructions to the storage system, the at least one input device, and the at least one output device.

Program codes for implementing the methods of the present disclosure may be written in one programming language or any combination of more programming languages. These program codes may be provided to a processor or controller of a general-purpose computer, a dedicated computer or other programmable data processing apparatus, such that the program codes, when executed by the processor or controller, cause the functions/operations specified in the flowcharts and/or block diagrams to be implemented. The program codes may be executed entirely on a machine, partially on a machine, partially on a machine and partially on a remote machine as a stand-alone software package or entirely on a remote machine or server.

In the context of the present disclosure, a machine-readable medium may be a tangible medium that may contain or store a program for use by or in connection with an instruction execution system, an apparatus or a device. The machine-readable medium may be a machine-readable signal medium or a machine-readable storage medium. The machine-readable medium may include, but is not limited to, an electronic, magnetic, optical, electromagnetic, infrared, or semiconductor system, apparatus or device, or any suitable combination of the above. More specific examples of the machine-readable storage medium may include an electrical connection based on one or more wires, a portable computer disk, a hard disk, a random access memory (RAM), a read only memory (ROM), an erasable programmable read only memory (EPROM or a flash memory), an optical fiber, a compact disk read only memory (CD-ROM), an optical storage device, a magnetic storage device, or any suitable combination of the above.

In order to provide interaction with the user, the systems and technologies described here may be implemented on a computer including a display device (for example, a CRT (cathode ray tube) or LCD (liquid crystal display) monitor) for displaying information to the user, and a keyboard and a pointing device (for example, a mouse or a trackball) through which the user may provide the input to the computer. Other types of devices may also be used to provide interaction with the user. For example, a feedback provided to the user may be any form of sensory feedback (for example, visual feedback, auditory feedback, or tactile feedback), and the input from the user may be received in any form (including acoustic input, speech input or tactile input).

The systems and technologies described herein may be implemented in a computing system including back-end components (for example, a data server), or a computing system including middleware components (for example, an application server), or a computing system including front-end components (for example, a user computer having a graphical user interface or web browser through which the user may interact with the implementation of the system and technology described herein), or a computing system including any combination of such back-end components, middleware components or front-end components. The components of the system may be connected to each other by digital data communication (for example, a communication network) in any form or through any medium. Examples of the communication network include a local area network (LAN), a wide area network (WAN), and the Internet.

The computer system may include a client and a server. The client and the server are generally far away from each other and usually interact through a communication network. The relationship between the client and the server is generated through computer programs running on the corresponding computers and having a client-server relationship with each other. The server may be a cloud server, also known as a cloud computing server or a cloud host, which is a host product in a cloud computing service system to solve shortcomings of difficult management and weak business scalability existing in an existing physical host and VPS (Virtual Private Server) service. The server may also be a server of a distributed system or a server combined with a block-chain.

It should be understood that steps of the processes illustrated above may be reordered, added or deleted in various manners. For example, the steps described in the present disclosure may be performed in parallel, sequentially, or in a different order, as long as a desired result of the technical solution of the present disclosure may be achieved. This is not limited in the present disclosure.

The above-mentioned specific embodiments do not constitute a limitation on the scope of protection of the present disclosure. Those skilled in the art should understand that various modifications, combinations, sub-combinations and substitutions may be made according to design requirements and other factors. Any modifications, equivalent replacements and improvements made within the spirit and principles of the present disclosure shall be contained in the scope of protection of the present disclosure.

What is claimed is:

1. A method of processing a video, comprising:
   extracting, for a video to be processed, a plurality of video features under a plurality of receptive fields;
   extracting a local feature of the video to be processed according to a video feature under a target receptive field in the plurality of receptive fields, wherein the target receptive field is any receptive field between a largest receptive field and a smallest receptive field in the plurality of receptive fields;
   obtaining a global feature of the video to be processed according to a video feature under the largest receptive field in the plurality of receptive fields; and
   merging the local feature and the global feature to obtain a target feature of the video to be processed,

wherein the extracting a local feature of the video to be processed according to a video feature under a target receptive field in the plurality of receptive fields comprises:

extracting a video feature under the target receptive field according to a sliding window with a predetermined size, so as to obtain a plurality of video sub-features;

processing, for each sub-feature in the plurality of video sub-features, the sub-feature by using an attention algorithm, so as to obtain a processed sub-feature; and obtaining the local feature according to a plurality of processed sub-features obtained for the plurality of video sub-features.

2. The method according to claim 1, wherein the obtaining the local feature according to a plurality of processed sub-features obtained for the plurality of video sub-features comprises:

merging the plurality of processed sub-features to obtain a merged feature;

extracting a weight feature of the merged feature by using a three-dimensional convolution; and weighting the merged feature according to the weight feature, so as to obtain the local feature.

3. The method according to claim 1, wherein the extracting a video feature under the target receptive field according to a sliding window with a predetermined size, so as to obtain a plurality of video sub-features comprises:

moving the sliding window according to a first predetermined stride of a spatial dimension and a second predetermined stride of a temporal dimension, so as to extract the plurality of video sub-features, wherein the first predetermined stride is less than a length of the sliding window in the spatial dimension, and the second predetermined stride is less than a length of the sliding window in the temporal dimension.

4. The method according to claim 1, wherein the merging the local feature and the global feature to obtain a target feature of the video to be processed comprises:

merging the local feature and the global feature by using a cross attention algorithm, so as to obtain the target feature.

5. The method according to claim 4, wherein the merging the local feature and the global feature by using a cross attention algorithm, so as to obtain the target feature comprises:

obtaining a query feature according to the global feature;

obtaining a key feature and a value feature according to the local feature; and obtaining the target feature according to the query feature, the key feature and the value feature by using the cross attention algorithm.

6. An electronic device, comprising:

at least one processor; and a memory communicatively connected to the at least one processor, wherein the memory stores instructions executable by the at least one processor, and the instructions, when executed by the at least one processor, cause the at least one processor to implement the method of claim 1.

7. The electronic device according to claim 6, wherein the instructions, when executed by the processor, cause the processor further to implement operations of:

merging the plurality of processed sub-features to obtain a merged feature;

extracting a weight feature of the merged feature by using a three-dimensional convolution; and

weighting the merged feature according to the weight feature, so as to obtain the local feature.

8. The electronic device according to claim 6, wherein the instructions, when executed by the processor, cause the processor further to implement operations of:

moving the sliding window according to a first predetermined stride of a spatial dimension and a second predetermined stride of a temporal dimension, so as to extract the plurality of video sub-features, wherein the first predetermined stride is less than a length of the sliding window in the spatial dimension, and the second predetermined stride is less than a length of the sliding window in the temporal dimension.

9. The electronic device according to claim 6, wherein the instructions, when executed by the processor, cause the processor further to implement operations of:

obtaining a query feature according to the global feature;

obtaining a key feature and a value feature according to the local feature; and obtaining the target feature according to the query feature, the key feature and the value feature by using the cross attention algorithm.

10. A non-transitory computer-readable storage medium having computer instructions therein, wherein the computer instructions are configured to cause a computer to implement the method of claim 1.

11. A method of querying a video, comprising:

extracting a text feature of a query text;

acquiring a target feature of each video in a plurality of candidate videos; and determining, from the plurality of candidate videos, a video matched with the query text according to the text feature and the target feature, wherein the target feature is obtained by using a method of processing a video, comprising operations of:

extracting, for a video to be processed, a plurality of video features under a plurality of receptive fields;

extracting a local feature of the video to be processed according to a video feature under a target receptive field in the plurality of receptive fields, wherein the target receptive field is any receptive field between a largest receptive field and a smallest receptive field in the plurality of receptive fields;

obtaining a global feature of the video to be processed according to a video feature under the largest receptive field in the plurality of receptive fields; and merging the local feature and the global feature to obtain a target feature of the video to be processed, wherein the extracting a local feature of the video to be processed according to a video feature under a target receptive field in the plurality of receptive fields comprises:

extracting a video feature under the target receptive field according to a sliding window with a predetermined size, so as to obtain a plurality of video sub-features;

processing, for each sub-feature in the plurality of video sub-features, the sub-feature by using an attention algorithm, so as to obtain a processed sub-feature; and obtaining the local feature according to a plurality of processed sub-features obtained for the plurality of video sub-features.

12. An electronic device, comprising:

at least one processor; and a memory communicatively connected to the at least one processor, wherein the memory stores instructions executable by the at least one processor, and the instructions, when executed by the at least one processor, cause the at least one processor to implement the method of claim 11.

13. A non-transitory computer-readable storage medium having computer instructions therein, wherein the computer instructions are configured to cause a computer to implement the method of claim 11.

14. A method of training a video processing model, wherein the video processing model comprises a video feature extraction network, a local feature extraction network and a feature merging network; the method comprises:

inputting a sample video contained in sample data into the video feature extraction network, so as to obtain a plurality of video features under a plurality of receptive fields;

inputting a video feature under a target receptive field in the plurality of receptive fields into the local feature extraction network, so as to obtain a local feature of the sample video, wherein the target receptive field is any receptive field between a largest receptive field and a smallest receptive field in the plurality of receptive fields;

obtaining a global feature of the sample video according to a video feature under the largest receptive field in the plurality of receptive fields;

inputting the local feature and the global feature into the feature merging network, so as to obtain a target feature of the sample video;

acquiring a text feature of a sample text in the sample data; and training the video processing model according to the target feature and the text feature, wherein the inputting a video feature under a target receptive field in the plurality of receptive fields into the local feature extraction network, so as to obtain a local feature of the sample video comprises: by using the local feature extraction network, extracting a video feature under the target receptive field according to a sliding window with a predetermined size, so as to obtain a plurality of video sub-features;

processing, for each sub-feature in the plurality of video sub-features, the sub-feature by using an attention algorithm, so as to obtain a processed sub-feature; and obtaining the local feature according to a plurality of processed sub-features obtained for the plurality of video sub-features.

15. The method according to claim 14, wherein the text feature comprises a sentence-level feature of the sample text; the training the video processing model according to the target feature and the text feature comprises:

training the video processing model according to a similarity between the target feature and the sentence-level feature.

16. The method according to claim 15, wherein the text feature further comprises a word-level feature of the sample text; the method further comprises:

training the video processing model according to the local feature and the word-level feature.

17. The method according to claim 16, wherein the word-level feature comprises a plurality of word features respectively corresponding to a plurality of entity words contained in the sample text; the training the video processing model according to the local feature and the word-level feature comprises:

determining a similarity between each word feature in the plurality of word features and the local feature, so as to obtain a plurality of first similarities; and training the video processing model according to the plurality of first similarities.

18. The method according to claim 17, wherein the training the video processing model according to the local feature and the word-level feature further comprises:

determining, for each word feature, a similarity between the word feature and the local feature of the sample video in target sample data, so as to obtain a plurality of second similarities respectively corresponding to the plurality of word features;

determining a loss of the video processing model according to the plurality of first similarities and the plurality of second similarities; and training the video processing model according to the loss, wherein the sample text in the target sample data does not contain a word corresponding to the plurality of word features.

\* \* \* \* \*